United States Patent
Monk

(10) Patent No.: US 10,674,703 B2
(45) Date of Patent: *Jun. 9, 2020

(54) SPECIES SPECIFIC FEEDER

(71) Applicant: Harold G. Monk, Denham Springs, LA (US)

(72) Inventor: Harold G. Monk, Denham Springs, LA (US)

( * ) Notice: Subject to any disclaimer, the term of this patent is extended or adjusted under 35 U.S.C. 154(b) by 340 days.

This patent is subject to a terminal disclaimer.

(21) Appl. No.: 15/078,113

(22) Filed: Mar. 23, 2016

(65) Prior Publication Data

US 2017/0273277 A1 Sep. 28, 2017

(51) Int. Cl.
| | | |
|---|---|---|
| *A01K 5/02* | (2006.01) | |
| *A01M 29/24* | (2011.01) | |
| *A01K 29/00* | (2006.01) | |
| *A01K 5/01* | (2006.01) | |

(52) U.S. Cl.
CPC .............. *A01K 5/025* (2013.01); *A01K 5/0142* (2013.01); *A01K 5/0225* (2013.01); *A01K 29/005* (2013.01); *A01M 29/24* (2013.01)

(58) Field of Classification Search
CPC ...... A01K 5/0114; A01K 5/0142; A01K 5/02; A01K 5/0225; A01K 39/012; A01K 39/0125
USPC .............. 119/51.02, 51.11, 52.1, 52.4, 56.1
See application file for complete search history.

(56) References Cited

U.S. PATENT DOCUMENTS

| | | | |
|---|---|---|---|
| 3,465,724 A | 9/1969 | Broadbent | |
| 3,897,753 A | 8/1975 | Lee | |
| 7,124,707 B1 * | 10/2006 | Clarke | A01K 5/0114 119/51.02 |
| 7,685,966 B2 * | 3/2010 | Goehring | A01K 5/0114 119/51.02 |
| 7,959,937 B2 | 6/2011 | Sloop | |
| 9,295,225 B2 * | 3/2016 | Monk | A01K 5/0142 |
| 2006/0180093 A1 | 8/2006 | Cross | |
| 2011/0297090 A1 | 12/2011 | Chamberlain | |
| 2014/0261201 A1 | 9/2014 | Monk | |
| 2014/0318473 A1 * | 10/2014 | Cole | A01K 39/0113 119/712 |

(Continued)

FOREIGN PATENT DOCUMENTS

WO    20130049226 A1    4/2013

OTHER PUBLICATIONS

Lapidge, Steven, Development of a Feral Swine Toxic Bait (Hog-Gone®) and Bait Hopper (Hog-Hopper™) in Australia and the USA, Proceedings of the 14th WDM Conference, 2012, p. 19-24.

(Continued)

*Primary Examiner* — David J Parsley
(74) *Attorney, Agent, or Firm* — John B. Edel; Edel Patents LLC

(57) ABSTRACT

Animal feeders are disclosed that include a barrier limiting access to feed inside the feeder, doors controlled by an actuator and a control system configured to feed certain species to the exclusion of others by the recognition of those species. Cameras and, in some cases, other detectors are used to detect and identify animals by species. Doors may be configured to be open by default and remain open for the feeding of desired animals with the doors closing to prevent feeding upon the approach of an animal targeted for exclusion.

8 Claims, 1 Drawing Sheet

(56) References Cited

U.S. PATENT DOCUMENTS

| | | | |
|---|---|---|---|
| 2015/0216145 A1* | 8/2015 | Nelson | A01K 39/01 119/51.02 |
| 2016/0088817 A1* | 3/2016 | Priefert | A01K 5/0291 119/51.12 |
| 2016/0192620 A1* | 7/2016 | Hu | A01K 5/0114 119/51.02 |

OTHER PUBLICATIONS

Written Opinion and Search Report from potentially relevant application PCT/US14/24851 dated Aug. 21, 2014.

Wildlife Management Services, about web-page describing older feeder version, http://www.wildlife-m-s.com/about.html, captured Sep. 19, 2014. The subject matter disclosed was obtained directly or indirectly from the inventor or was disclosed directly by the inventor.

Screen shot from The Weather Channel, Animal Invaders, Season 2 Episode 7, First Aired: Dec. 1, 2014. The subject matter disclosed was obtained directly or indirectly from the inventor.

2014 Wild Pig Conference Agenda, Apr. 13, 2014. Montgomery Alabama. The subject matter disclosed was obtained directly or indirectly from the inventor or was disclosed directly by the inventor.

2014 Wild Pig Conference PowerPoint presentation, Apr. 13, 2014. Montgomery Alabama. The subject matter was disclosed directly by the inventor.

Jun. 24, 2015 Final rejection of ultimately allowed U.S. Appl. No. 13/833,764 listing common inventor Harold Monk.

\* cited by examiner

SPECIES SPECIFIC FEEDER

Species specific feeders described herein may be used in the feeding of particular species of animals to the exclusion of other species. Certain species specific feeders disclosed herein may have particular utility in the feeding of animals such as deer and other animals that may tend to avoid feeders that are noisy or move when those animals approach.

DETAILED DESCRIPTION

Example 1

Figure 1:
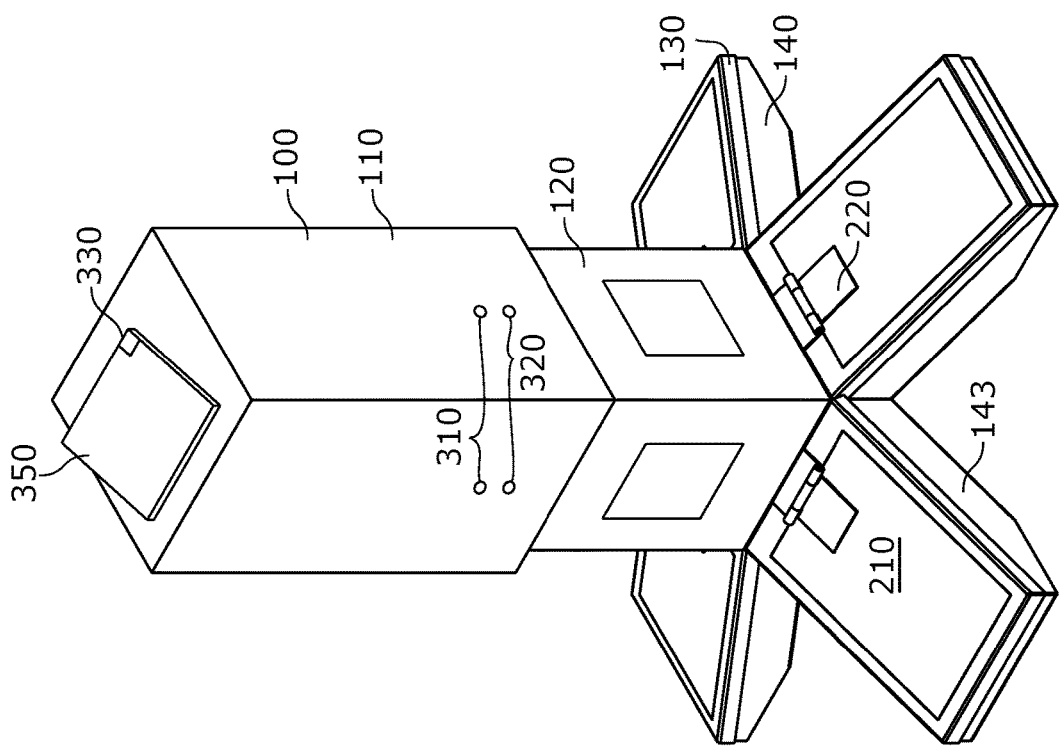
FIG. 1 shows a perspective view of a species specific feeder.

Referring now to FIG. 1 of the drawings, the Species specific feeder 100, may contain Feed container 110, Feeder midsection 120, Feeder bay cover 130, Feeder base 140, Feeder bays 143, Door 210, Hinge 220, Camera 310, Ultrasonic range finder 320, Moisture sensor 330 and Solar Panel 350. Species specific feeder 100 may be configured for the feeding of particular species of animal while excluding other particular species of animal Feed container 110 may contain substantial quantities of animal feed and may be located in an upper region of Species specific feeder 100. Feeder midsection 120 may contain various electrical and mechanical components for the operation of Species specific feeder 100 and animal feed may pass through Feed container 110 in route to Feeder bays 143. Feeder bays 143 may house corn, grain, or other forms of animal feed which may be intermittently accessible through Door 210. Door 210 may open by pivoting around Hinge 220. Feeder bay cover 130, which surrounds Door 210, and Door 210 may be electrically conductive and may be configured to deliver a deterrent electrical shock on an intermittent basis. Feeder base 140 may form the bottom of Species specific feeder 100 and may be constructed of a material that is an electrical insulator. Camera 310 and Ultrasonic range finder 320 may be used in the location and identification of various species of animals. Moisture sensor 330 may be used to detect rain and other high moisture circumstances that may detract from the useful life of feed in Feeder bays 143. Solar Panel 350 may be used as a power source for Species specific feeder 100.

Figure 2:
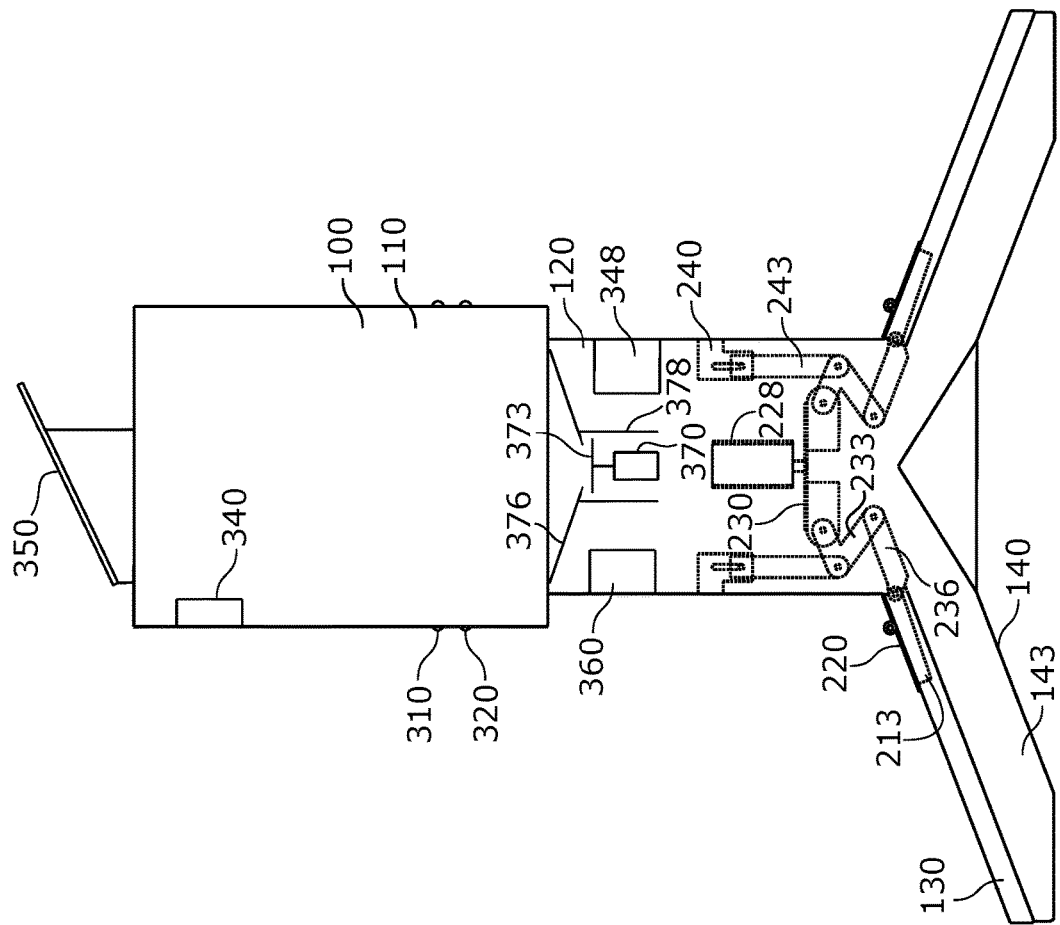
FIG. 2 shows an elevation cut away view of a species specific feeder.

Certain embodiments of Species specific feeder 100 may have components depicted in FIG. 2 of the drawings such as Feed container 110, Feeder midsection 120, Feeder bay cover 130, Feeder base 140, Feeder bays 143, Hinge lever 213, Hinge 220, Door actuator 228, Actuator connection frame 230, First lever arm 233, Second lever arm 236, Support bracket 240, Support arm 243, Camera 310, Ultrasonic range finder 320, Battery 348, Solar Panel 350, Electric pulse generator 360, Computer 340, Feed delivery motor 370, Feed distributer 373, Feed container cone 376 and Feed baffle 378. Species specific feeder 100 may have a Feed container 110 above Feeder midsection 120 configured such that feed travels down Feed container cone 376 and is delivered to Feeder bays 143 by way of Feed distributer 373 which is intermittently driven by Feed delivery motor 370. Feed baffle 378 directs the flow of feed downward toward Feeder bays 143. Feeder bay cover 130 and the feed doors may be configured to deliver an electric shock under certain circumstances. Feeder base 140 may both form the bottom of Feeder bays 143 and serve as an electrical insulator such that Electric pulse generator 360 may deliver a non-lethal electrical shock to particular animal species targeted for deterrence from feeding without need for further insulation from grounding. Computer 340 or some combination of computing and recognition devices may direct and control the operation of Species specific feeder 100 including taking information from Camera 310 and Ultrasonic range finder 320 for the location and identification of various species. Computer 340 may for example be a Raspberry Pi 2 Model B Project Board with one gigabyte of RAM and a 900 MHz Quad-Core processor.

The doors may be operated by a significant number mechanical combinations. One such combination, depicted in the FIG. 2, involves a single actuator configured to operate all of the doors. In that configuration, Support bracket 240 holds Support arm 243 limiting its motion such that the movement of Actuator connection frame 230 by Door actuator 228 causes First lever arm 233 and Second lever arm 236 to move Hinge lever 213 about Hinge 220 in a way that either opens or closes the doors. Door actuator 228 may be a 12 volt 2 inch Linear Actuator with a stroke sufficient to fully operate the doors. Battery 348 may be a 12 volt battery and may be used to power Species specific feeder 100. Solar Panel 350 may be used to maintain a charge in Battery 348.

Example 2

Species specific feeder 100 may be configured such that Doors 210 are initially open and open by default. In particular, Computer 340 may be configured such that Doors 210 remain open so long as no animals are detected in the vicinity of Species specific feeder 100. Cameras 310 may be configured such that they are not operating when no animals are present. Ultrasonic range finder 320 or another device capable of recognizing the presence of animals in proximity to Species specific feeder 100 may be in continuous operation and serve initiate operation of Cameras 310 when there is an indication by Ultrasonic range finder 320 of a possible animal in the vicinity of Species specific feeder 100. Upon the indication of a potential animal proximate to Species specific feeder 100, Computer 340 may initiate operation of Cameras 310 to gather photographic or video information about the surroundings of Species specific feeder 100. Computer 340 may have the ability to identify a particular species from the photographic or video information and in many cases will have the ability to identify multiple separate species of animal Computer 340 may operate to grant access to the feed to a particular species of animal identified during a species identification operation. In certain embodiments particularly directed to the feeding of animals with the potential to be frightened or deterred from feeding by noises or motions, a multiple species recognition method may allow for effective feeding that could otherwise be difficult to accomplish. In such embodiments, the Species specific feeder 100 may be configured to have Doors 210 initially open and open by default along with Electric pulse generator 360 disabled by default. In such an embodiment, an animal targeted for feeding, such as a deer, may approach the feeder. Species specific feeder 100 may recognize the presence of the deer by way of Ultrasonic range finder 320 which in turn may trigger the operation of Cameras 310. Cameras 310 and Ultrasonic range finder 320 may operate in relative silence so as not to disturb the deer. In cases where Computer 340 recognizes the presence of deer and does not recognize the presence of any species targeted for exclusion from feeding, Species specific feeder 100 would remain in its default state of having Doors 210 open and Electric pulse generator 360 disabled allowing the deer to feed from Feeder bays 143 without creating any noises that are likely to disturb or scare the deer. Namely, the deer is able to approach and feed from Species specific feeder 100 without the movement of any significant mechanical component of Species specific feeder 100. The lack of noise from the mechanical movements of Species specific feeder 100 allows deer to feed from Species specific feeder 100 undisturbed. Electric pulse generator 360 energizes Species specific feeder 100 at times when electrical pulses are used as a feeding deterrent. Electric pulse generator 360 is an electrical pulse generating device comparable to devices used in certain animal enclosures and is capable of delivering a brief, nonlethal, and deterrent shock to animals coming into contact with the electrical conductor energized by Electric pulse generator 360. Electric pulse generator 360 may for example be the 5 Mile Battery Operated Solid State Charger sold as model number EDC5M-Z by Woodstream Corporation.

Information from Moisture sensor 330 communicated to Computer 340 allows Species specific feeder 100 to respond to rain and other high moisture environmental conditions by closing Doors 210 to protect the feed from those adverse environmental conditions. Moisture sensor 330 may be a modular humidity, rain and weather detector configured for use with microcontroller boards such as Arduino boards. The ability of Species specific feeder 100 to respond to those adverse environmental conditions protects the feed from deterioration and spoilage without significantly compromising the ability of animals targeted for feeding to feed at the feeder. Species specific feeder 100 may reopen after the adverse environmental conditions pass based on information gathered from Moisture sensor 330.

Species specific feeder 100 may also be configured to respond to the presence of species identified as undesirable species. Multiple species may be identified as undesirable species. For example, bears and raccoons may be indicated as undesirable animals. When a bear approaches Species specific feeder 100 Ultrasonic range finder 320 may trigger the operation of Cameras 310 which in turn provide images to Computer 340. Cameras 310 may be 1 megapixel high definition universal serial bus cameras and may be configured for night vision as well as daytime vision by way of infrared LED lighting. Computer 340, upon identifying that the approaching species identified for exclusion from feeding, may direct the closing of Doors 210 and the arming of Electric pulse generator 360 thereby energizing Doors 210 and Feeder bay cover 130. The ordering of steps for the operation of Species specific feeder 100 in a way that identifies and excludes one or more undesirable species while at the same time avoiding undesirable motions and noise by Species specific feeder 100 in the presence of a desired species minimizes the chances that a desirable species, such as a deer would be detered from feeding at Species specific feeder 100.

Computer 340 may, for example, have stored or have access to either a collection of images for each species targeted for recognition or a data set characteristic of each species targeted for recognition. For example, the computer may have an archive of 1500 images of deer that may be compared to the images from Cameras 310 such that deer may be positively identified. Similarly, a data set derived from of 1500 images of deer may be used to positively identify deer based on images from Cameras 310. Similar image sets or data sets may be used for any number of additional animal species including raccoons, bears, rabbits, squirrels, etc.

In certain embodiments, the control system may comprise a video detector and may be configured for non-discriminating animal detection. Non-discriminating animal detection may include ultrasonic detection of animals, infrared detection of animals, video detection of animals or other similar equipment and/or methods for the detection of the presence of one or more animals. Non-discriminating animal detection encompasses video detection that merely identifies the presence of an animal or the likely presence of an animal but does not encompass a level of discrimination sufficient to positively identify the species to which an animal belongs. In certain particular embodiments involving non-discriminating animal detection, a single camera may be used for both non-discriminating animal detection and discriminating animal detection. In many cases, power consumption during non-discriminating animal detection would be significantly less than power consumption during the positive identification of the species of an animal. Such lower power consumption may be due, among other reasons, to lessened computational load on the computer processor or processors. The presence of non-discriminating animal detection may therefore extend the life of the batteries and may reduce the total overall power consumption of the species specific feeder.

Further Terminology and Examples

As used herein, the term "species" indicates animal species such that the term "species" and the phrase "species of animal" are not intended to convey different meaning. As used herein, the phrase "water detection device" includes rain detectors, moisture sensors, precipitation detectors and other devices capable of identifying circumstances that may lead to various forms of deterioration of animal feed held by the species specific feeder related to the presence of water in any phase or form. As used herein, the phrase "excluded species" indicates a species that is unable to feed from the species specific feeder. As used herein, the phrase "included species" indicates a species that is able to feed from the species specific feeder. As used herein, the phrase "recognizable species" indicates a species for which the species specific feeder is configured to positively identify member animals by their species. As used herein, the phrase "exclusion target species" indicates recognizable species that are also excluded species. As used herein, the phrase "inclusion target species" indicates recognizable species that are also included species. As used herein, the phrase "door operation volume" indicates an average volume in decibels produced by door operation in the species specific feeder. As used herein, the phrase "low-volume operation" indicates operation of the species specific feeder that is less than one third of the door operation volume. Decibel measurements described herein indicate measurements at ground level 10 feet from the species specific feeder. As used herein, the phrase "high-volume operation" indicates operation of the species specific feeder that is greater than two thirds of the door operation volume.

Animal feeders described herein may, for example, have an external barrier limiting access to a feed inside the animal feeder; a first door actuated by an actuator; a control system and a non-discriminating animal detector; such that the control system may have an image detector; the control system may have an image recognition component capable of recognizing a first species of animal and a second species of animal based on an image captured from the image detector; the image recognition component may be configured to operate in response to the detection of an animal by the non-discriminating animal detector; the first door may be configured to be open when a member of an exclusion target species not detected and such that the control system is configured to take an action selected from closing the first door and energizing an electrical shock deterrent in response to the presence of the member of the exclusion target species. An external barrier may, for example, include one or more of doors, covers, frame materials and walls. The first door may be Door 210 and any number of additional doors may be included based on the need of the animals being fed, among other factors. Door actuator 228 is an example an actuator. Actuators may be mechanical, pneumatic or hydraulic and may take any number of forms including the form depicted in FIG. 1 and FIG. 2. An ultrasonic range finder is an example of a non-discriminating animal detector. Another example of a non-discriminating animal detector is an infrared detector. The image detector may take the form of a still picture camera or it may take the form of a video detector. The control system may include a processor, memory or storage, programming directed to the recognition of animal species and one or more input devices such as a camera. The image recognition component may have any number of hardware and software components arranged to recognize animal species from gathered images. An image recognition component capable of recognizing a first species of animal and a second species of animal has sufficient data characteristic of the first species and sufficient data characteristic of the second species to positively identify both the first species and the second species. Embodiments in which the first door is configured to be open when a member of an exclusion target species is not detected are separate from and distinct from embodiments in which the doors open in response to the recognition of the species to be fed. The exclusion target species may be selected from raccoon, squirrel and bear, among many options which are likely to vary depending on the desires of the user. In a related example, the control system may be configured to operate in a reduced power state when the non-discriminating animal detector is not detecting the animal. The reduced power state may be attributable to one or more circumstances such as the camera not operating and a reduced load on one or more processors. The reduced load on the processors may made possible by the design of the species specific feeder which may be configured to conduct species recognition processes on an intermittent basis. In a further related example, the animal feeder may have a second door arranged and configured for synchronized operation with the first door. In a further related example, the animal feeder may have an electrical shock deterrent in communication with the control system and the electrical shock deterrent may be configured to be energized in the presence of the exclusion target species, the feeder may have an electrically insulating base configured to allow a substantial electrical potential difference between a component in a feeding space and an electrical ground such that the feeding space may encompass the first door. The bottoms of Feeder bays 143 may be constructed of an insulating polymeric material or other insulating material thereby creating the electrically insulating base. The electrical potential difference facilitated by the electrically insulating base may permit the effective use of the electric shock deterrent. Doors 210 and Feeder bay cover 130 may be part of the feeding space. In a still further related example, the control system may also have an ultrasonic detector configured to detect the presence of an animal.

Animal feeders described herein may, for example comprise an external barrier limiting access to a feed inside the animal feeder; a first door actuated by an actuator; a control system; and a water detection device configured to detect elevated moisture; such that the control system may have an image detector; the control system may have an image recognition component capable of recognizing a first species of animal and a second species of animal based on an image captured from the image detector; the control system may be configured to temporarily close the first door in response to an output from the water detection device; the first species of animal and the second species of animal may be characterized as an exclusion target species; the control system may be configured to take an action selected from closing the first door and energizing an electrical shock deterrent in response to the recognition of the first species of animal and the control system may be configured to take an action selected from closing the first door and energizing the electrical shock deterrent in response to the recognition of a second species of animal. In a related example, the animal feeder may have a second door arranged and configured for synchronized operation with the first door. In a related example, the animal feeder may also have an electrically insulating base configured to allow a substantial electrical potential difference between a component in a feeding space and an electrical ground, such that the feeding space encompasses the first door, the electrical shock deterrent is in communication with the control system and such that the electrical shock deterrent is configured to be energized in the presence of the exclusion target species. In a related example, the animal feeder may also have a non-discriminating animal detector such that the image recognition component is configured to operate in response to the detection of an animal by the non-discriminating animal detector.

Animal feeders described herein may, for example have an external barrier limiting access to a feed inside the animal feeder; a first door actuated by an actuator and a control system; such that the control system may have an image detector; the control system may have an image recognition component capable of recognizing an exclusion target species and capable of recognizing an inclusion target species; the control system may be configured to maintain the animal feeder in a low-volume operation state throughout a period of time in which a member of the inclusion target species approaches the animal feeder and feeds from the animal feeder and such that the control system may be configured to initiate a high-volume operation upon the approach of a member of the exclusion target species thereby preventing the member of the exclusion target species from feeding from the animal feeder. Closing the doors is an example of a high-volume operation. In a related example, the animal feeder may have a second door arranged and configured for synchronized operation with the first door. In a related example, the animal feeder may have an electrical shock deterrent in communication with the control system wherein the electrical shock deterrent may be configured to be energized in the presence of the exclusion target species and the animal feeder may have an electrically insulating base configured to allow a substantial electrical potential difference between a component in a feeding space and an electrical ground such that the feeding space encompasses the first door. In a related example, the animal feeder may also have a non-discriminating animal detector such that the image recognition component may be configured to operate in response to the detection of an animal by the non-discriminating animal detector. In a related example, the control system may be configured to operate in a reduced power state when the non-discriminating animal detector is not detecting the animal. In a related example, the animal feeder may have a water detection device configured to detect elevated moisture such that the control system may be configured to temporarily close the first door in response to an output from the water detection device and such that the control system may also have an ultrasonic detector configured to detect the presence of the animal.

The above-described embodiments have a number of independently useful individual features that have particular utility when used in combination with one another including combinations of features from embodiments described separately. There are, of course, other alternate embodiments which are obvious from the foregoing descriptions of the invention, which are intended to be included within the scope of the invention, as defined by the following claims.

What is claimed is:

1. An animal feeder comprising:
   a. an external barrier limiting access to a feed inside the animal feeder;
   b. a first door actuated by an actuator and
   c. a control system;
   d. wherein the control system comprises an image detector;
   e. wherein the control system has an image recognition component capable of recognizing a first species of animal and a second species of animal based on an image captured from the image detector;
   f. wherein the first species of animal is a first exclusion target species and wherein the second species of animal is a second exclusion target species;
   g. wherein the first door is configured persist in a normally open state when no member of any exclusion target species is detected without regard to the presence or absence of a third species which is an inclusion target species;
   h. wherein the control system is configured to take an action selected from closing the first door and energizing an electrical shock deterrent in response to the presence of a member of the first exclusion target species;
   i. wherein the control system is configured to take an action selected from closing the first door and energizing the electrical shock deterrent in response to the presence of a member of the second exclusion target species and
   j. wherein the control system is configured to maintain the animal feeder in a low-volume operation state from a time before the third species is viewable by the image detector, through a recognition of the third species by the image recognition component, through the third species feeding at the animal feeder and until such time that the third species is no longer viewable by the image detector.

2. The animal feeder of claim 1 further comprising a second door arranged and configured for synchronized operation with the first door.

3. The animal feeder of claim 1
   wherein the control system is configured to energize the electrical shock deterrent in response to the presence of the member of the first exclusion target species and
   wherein the animal feeder further comprises an electrically insulating base configured to allow a substantial electrical potential difference between a component in a feeding space and an electrical ground, wherein the feeding space encompasses the first door, wherein the electrical shock deterrent is in communication with the control system and wherein the electrical shock deterrent is configured to be energized in the presence of the member of the first exclusion target species.

4. The animal feeder of claim 1 wherein the control system further comprises an ultrasonic detector configured to detect the presence of an animal.

5. The animal feeder of claim 1
   wherein the control system is configured to energize the electrical shock deterrent in response to the presence of the member of the first exclusion target species;
   wherein the electrical shock deterrent is in communication with the control system;
   wherein the electrical shock deterrent is configured to be energized in the presence of the first exclusion target species;
   wherein the animal feeder further comprises an electrically insulating base configured to allow a substantial electrical potential difference between a component in a feeding space and an electrical ground and
   wherein the feeding space encompasses the first door.

6. The animal feeder of claim 1 further comprising a non-discriminating animal detector wherein the image recognition component is configured to operate in response to the detection of an animal by the non-discriminating animal detector.

7. The animal feeder of claim 6 wherein the control system is configured to operate in a reduced power state when the non-discriminating animal detector is not detecting the animal.

8. The animal feeder of claim 6 further comprising a water detection device configured to detect elevated moisture wherein the control system is configured to temporarily close the first door in response to an output from the water detection device and wherein the control system further comprises an ultrasonic detector configured to detect the presence of an animal.

* * * * *